United States Patent
Klassen (12)

(10) Patent No.: US 6,216,121 B1
(45) Date of Patent: Apr. 10, 2001

(54) WEB PAGE GENERATION WITH SUBTEMPLATES DISPLAYING INFORMATION FROM AN ELECTRONIC POST OFFICE SYSTEM

(75) Inventor: Christopher Laith Klassen, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/999,026

(22) Filed: Dec. 29, 1997

(51) Int. Cl.[7] .................................................. G06F 17/30
(52) U.S. Cl. .......................... 707/1; 707/10; 707/501; 709/206; 709/218; 345/356
(58) Field of Search .......................... 707/513, 501, 707/1, 10; 709/206, 218, 204, 203; 705/26; 345/356

(56) References Cited

U.S. PATENT DOCUMENTS

| | | | |
|---|---|---|---|
| 5,727,175 | * 3/1998 | Malone et al. | 345/356 |
| 5,768,510 | * 6/1998 | Gish | 709/203 |
| 5,790,793 | * 8/1998 | Higley | 709/218 |
| 5,835,712 | * 11/1998 | DuFresne | 395/200.33 |
| 5,850,519 | * 12/1998 | Vazana | 709/206 |
| 5,897,622 | * 4/1999 | Blinn et al. | 705/26 |
| 5,903,901 | * 5/1999 | Kawakura | 707/501 |
| 5,918,225 | * 6/1999 | White et al. | 707/3 |
| 5,937,160 | * 8/1999 | Davis et al. | 707/10 |
| 5,951,636 | * 9/1999 | Zerber | 709/202 |
| 5,987,480 | * 4/1999 | Donohue et al. | 707/501 |
| 5,987,504 | * 11/1999 | Toga | 709/206 |
| 6,057,841 | * 5/2000 | Thurlow et al. | 345/347 |
| 6,067,568 | * 5/2000 | Li et al. | 709/223 |

* cited by examiner

Primary Examiner—Hosain T. Alam
Assistant Examiner—Ella Colbert
(74) Attorney, Agent, or Firm—Kudirka & Jobse, LLP

(57) ABSTRACT

Disclosed is a system for generating units of information from a database maintained in a server. The units of information may be messages and the database may be a post office system. The server receives a request for units of information transmitted from a client computer over a network. The server then processes the request for information and generates a template. This template includes code in a first computer language that does not allow branching, such as the HyperText Markup Language (HTML), database access commands to access the requested units of information in the database, and a subtemplate command to generate contents of a subtemplate file into the template. The subtemplate command is written in a second computer language providing branching, such as C++, Java, Perl, etc. The subtemplate file called by the subtemplate command includes code in the first computer language. The server processes the template to generate a processed template. In processing the template, the server processes the subtemplate commands in the template and generates the contents of the subtemplate file into the template. The server further processes the contents of the subtemplate file generated into the template. The server also processes database access commands in the template to access the requested units of information from the database and inserts the accessed units of information into the template. After processing the template, the server transmits the processed template to the client computer.

18 Claims, 9 Drawing Sheets

FIG. 8a

```
<HTML><!-the Mailbox Template>
. . . .
. . . . .
<LISTMSGS=Mailbox.Msgs.HTM,5>
. . . .
. . . . .
</HTML>
```

FIG. 8b

```
<TR BGCOLOR="<!!-MSGBACKCOLOR>">
. . . .
. . . .
    </TD>
    <TD NOWRAP>
    <FONT SIZE="<!!-MSGSMALLFONTSIZE>" COLOR="<!!-TEXTCOLOR>">
    <!!-MSGDATE>
    <!-- Date received -->
    </FONT>
    </TD>
    <TD NOWRAP>
    <FONT SIZE="<!!-MSGSMALLFONTSIZE>" COLOR="<!!-TEXTCOLOR>">
    <!!-SIZE>
    <!-- Message size -->
    </FONT>
    </TD>
    <TD NOWRAP>
    <FONT SIZE="<!!-MSGFONTSIZE>" COLOR="<!!-TEXTCOLOR>">
    <B>
    <!!-AUTHOR=20> <!-- Author -->
    </B>
    </FONT>
    </TD>
</TR>
```

FIG. 8c

```
<HTML>
....
....
<TR BGCOLOR="<!!-MSGBACKCOLOR>">
....
....
    </TD>
    <TD NOWRAP>
    <FONT SIZE="<!!-MSGSMALLFONTSIZE>" COLOR="<!!-TEXTCOLOR>">
    10/9/97
    <!-- Date received -->
    </FONT>
    </TD>
    <TD NOWRAP>
    <FONT SIZE="<!!-MSGSMALLFONTSIZE>" COLOR="<!!-TEXTCOLOR>">
    1000
    <!-- Message size -->
    </FONT>
    </TD>
    <TD NOWRAP>
    <FONT SIZE="<!!-MSGFONTSIZE>" COLOR="<!!-TEXTCOLOR>">
    <B>
    Joe Jones
    </B>
    </FONT>
    </TD>
</TR>
....
....
<TR BGCOLOR="<!!-MSGBACKCOLOR>">
....
....
    </TD>
    <TD NOWRAP>
    <FONT SIZE="<!!-MSGSMALLFONTSIZE>" COLOR="<!!-TEXTCOLOR>">
    10/2/97
    <!-- Date received -->
    </FONT>
    </TD>
    <TD NOWRAP>
    <FONT SIZE="<!!-MSGSMALLFONTSIZE>" COLOR="<!!-TEXTCOLOR>">
    800
    <!-- Message size -->
    </FONT>
    </TD>
    <TD NOWRAP>
    <FONT SIZE="<!!-MSGFONTSIZE>" COLOR="<!!-TEXTCOLOR>">
    <B>
    Sally Smith
    ....
    ....
```

WEB PAGE GENERATION WITH SUBTEMPLATES DISPLAYING INFORMATION FROM AN ELECTRONIC POST OFFICE SYSTEM

BACKGROUND OF THE INVENTION

1. Field of the Invention

The present invention relates to a method for accessing information from an electronic post office system and, in preferred embodiments, using HyperText Markup Language (HTML) templates to generate and display post office information.

2. Description of the Related Art

An electronic post office system maintained within a network file server allows multiple computer users linked to the network file server to transmit electronic messages to each other. A message is the basic unit of exchange in the post office system. A message can include file attachments such as text, graphics, sounds, binary files, electronic forms, fax pages or any other data objects. The post office is the central repository for all messages and is typically implemented in a database system in the network file server. The post office has a mail directory, which lists all the people, post offices and gateways for message exchange. Each user maintains an individual mailbox within the post office system, which might include a folder for incoming messages, drafts of text messages not yet sent, a log of sent messages, trash folders for deleted messages, and folders for saved messages. Each user in the post office system has an assigned name which is used to identify and route mail to the user.

FIG. 1 illustrates how client computers 2a, 2b access a post office system 4 within a server computer 6 via a network connection 8 (e.g., LAN, WAN, etc.). FIG. 2 illustrates how a computer 10 at a remote location can connect to a post office system 20 via a TCP/IP connection 12 and the Internet 14. The post office system 20 is included in a server 16 which runs a mail protocol 18. A mail protocol is used to regulate communication between the client computer and the post office system. Protocols which regulate the flow of messages to a post office system via the Internet include the Post Office Protocol version 3 (POP3), the Internet Message Access Protocol version 4 (IMAP4), Lightweight Directory Access Protocol (LDAP), the proprietary Lotus cc:Mail Router protocol. etc. Both the client and post office system must use compatible protocols. For instance, software programs such as Netscape Navigator, Eudora Pro, and Microsoft Internet Explorer include the POP3 protocol, thereby allowing a client computer running these programs to access a post office system compatible with POP3.

In prior art electronic post office systems, client computers at remote location must include software compatible with the protocol and the post office system in order to communicate with the post office. If a user at a remote location did not have such special purpose software, then the user would not be able to access the post office. Moreover, in prior art post office systems, post office system software cannot be easily edited to change the presentation of mail box information. Most network administrators would not be able to readily edit the files provided with proprietary post office system software to alter how mail box information is displayed or create new display formats. Such difficulties inhibit network administrators from tailoring the presentation of post office information to the organizational needs.

Many computer application have user interfaces generated with templates coded in the HyperText Markup Language (HTML). HTML is not a computationally complete language as HTML does not include any method for branching, such as loops and conditional statements. This limitation in the HTML language further inhibits network administrators from tailoring user interfaces generated with HTML code to the organizational needs.

SUMMARY OF THE INVENTION

To overcome the limitations in the prior art described above, preferred embodiments of the present invention disclose a system for generating units of information from a database maintained in a server. The server receives a request for units of information transmitted from a client computer over a network. The server then processes the request for information and generates a template. This template includes code in a first computer language that does not allow branching, database access commands to access the requested units of information in the database, and a subtemplate command to generate contents of a subtemplate file into the template. The subtemplate command is written in a second computer language providing branching. The subtemplate file called by the subtemplate command includes code in the first computer language. The server processes the template to generate a processed template. In processing the template, the server processes the subtemplate commands in the template and generates the contents of the subtemplate file into the template. The server further processes the contents of the subtemplate file generated into the template. The server also processes database access commands in the template to access the requested units of information from the database and inserts the accessed units of information into the template. After processing the template, the server transmits the processed template to the client computer.

In further embodiments, the first computer language is the HTML language.

In still further embodiments, the database is an electronic post office system and a mail program processes the template to generate the processed template. The mail program includes a mail protocol program. Further, the requested units of information are messages maintained in the electronic post office system.

It is an object of the present invention to provide a system for accessing a post office system which takes advantage of generally available software, such as HTML, web browsers, instead of relying on proprietary post office system software to connect users with a post office system.

It is still a further object that templates including code in a computer language that does not allow branching, such as the HTML language, include subtemplate commands which call subtemplate files. When these commands are processed, the contents of the subtemplate are generated into the template.

It is a further object, that these subtemplates be used in an electronic post office system to display requested message information to a user. In this way, a system administrator can edit the template to modify the display of information accessed from a database, such as a post office system, by modifying a subtemplate called within the template. The system administrator need only edit the subcomponent subtemplate without altering other sections of the overall template.

It is yet a further object that the commands calling the subtemplates be written in a second computer language which includes branching, such as Perl, C++, Java™, and generate the subtemplates into the template for a series of iterations. Java is a product of Sun Microsystems, Inc. In this way, branching is provided to templates utilizing HTML code, thereby making the HTML language computationally complete.

BRIEF DESCRIPTION OF THE DRAWINGS

Referring now to the drawings in which like reference numbers represent corresponding parts throughout:

FIG. 8a shows a portion of a mail box HTML page in accordance with preferred embodiments of the present invention;

FIG. 8b shows a portion of a subtemplate HTML page in accordance with preferred embodiments of the present invention;

FIG. 8c shows pseudo code for a portion of a subtemplate command which generates the subtemplate into the template from which the subtemplate command was called.

FIG. 8d shows a portion of the mail box HTML page with the subtemplate HTML page generated therein in accordance with preferred embodiments of the present invention;

DETAILED DESCRIPTION OF THE PREFERRED EMBODIMENT

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware and Software Environment

Figure 1:
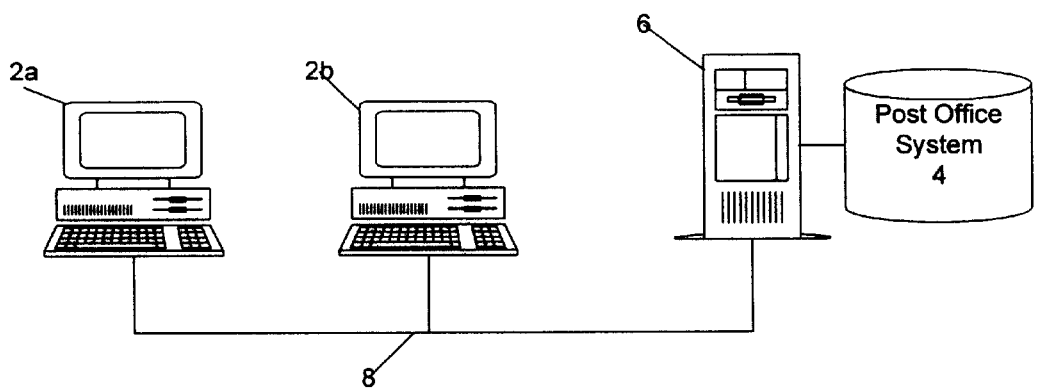
FIG. 1 is a block diagram that illustrates the relationship between a client computer and a post office system linked via a network, which is known in the prior art.
Figure 2:
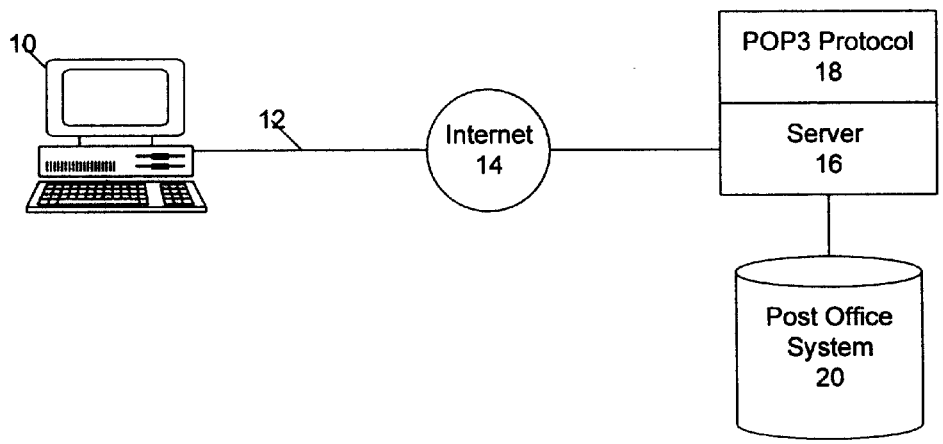
FIG. 2 is a block diagram that illustrates the relationship between a client computer and a post office system linked via the Internet, which is known in the prior art.
Figure 3:
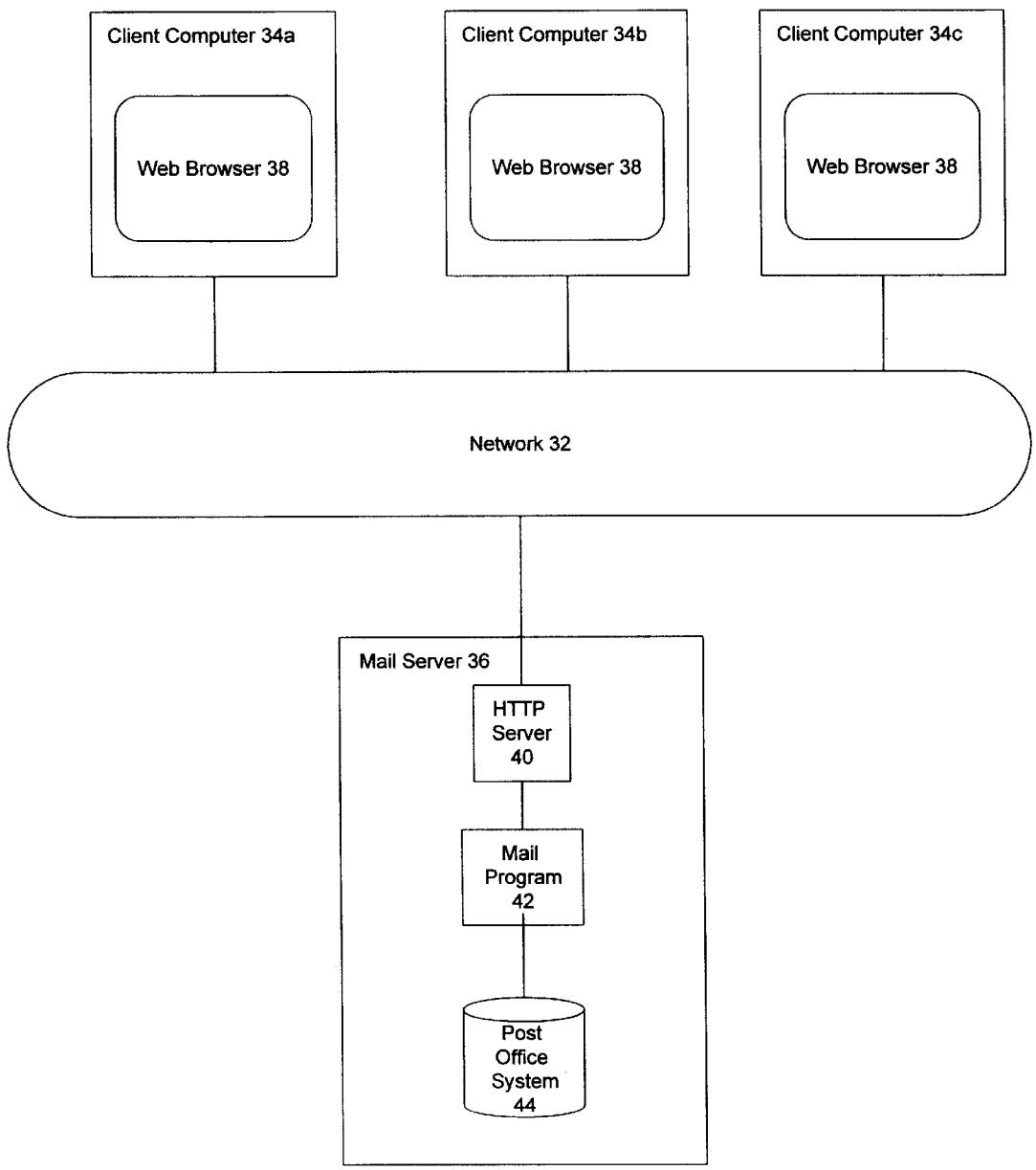
FIG. 3 is a block diagram that illustrates the relationship between a client computer and a post office system in accordance with preferred embodiments of the present invention.

FIG. 3 schematically illustrates the environment of the preferred embodiment of the present invention, and more particularly, illustrates a typical distributed computer system 30 using the Internet or other network 32 to connect a plurality of client computers 34a, b, c to a mail server 36. A typical combination of resources may include clients computers 34a, b, c that are personal computers, laptops, palmtops or workstations, and a mail server 36 that is a personal computer, workstation, minicomputer or mainframe. The mail server 36 may be implemented in one or more computers. The network 32 may comprise networks such as LANs, WANs, SNA networks, and the Internet.

In preferred embodiments, the client computers 34a, b, c include a Hyper Text Markup Language (HTML) web browser 38 (e.g., IBM's Web Explorer™, Netscape's Navigator™, Sun Microsystem's HotJava Browser™, Microsoft's Internet Explorer™, etc.). The mail server 36 includes a Hyper Text Transport Protocol (HTTP) server program 40 and a mail program 42. The mail program 42 provides access to a post office system 44, including all the post offices that users of the system may access. In further embodiments, the post office system 44 may be comprised of multiple post offices and include a message routing configuration to control the transfer of messages between post offices within the system. For instance, the post office system 44 may have a hub-spoke configuration in which messages are routed through a central hub post office, a direct connection configuration in which post offices exchange messages directly with one another or some combination of the two interconnected in a large and complex post office system.

Thus, the present invention may be implemented as a method, apparatus, or article of manufacture using standard programming and/or engineering techniques to produce software, firmware, hardware, or any combination thereof. The term "article of manufacture" as used herein is intended to encompass any device, carrier, or media that provides access to instructions and/or data useful in performing the same or similar functionality.

Those skilled in the art will recognize that the exemplary environment illustrated in FIG. 3 is not intended to limit the present invention. Indeed, those skilled in the art will recognize that other alternative hardware environments may be used without departing from the scope of the present invention. For instance, in alternative embodiments, the HTTP server 40, mail program 42, and post office system 44 or any combination thereof may be installed on a single computer server or over several servers distributed over a network.

Accessing a Mail System With a Web Browser

In the preferred embodiment, the directory for the mail program 42 is located in a directory relative to where the HTTP server program 40 is located. In this way, the web browser 38 in the client computer 34a, b, c transmits a URL command to call the mail program 42 to access the post office system 44. To access the post office system 44, a hypertext link would be added to an initial web page the HTTP server 40 presents to the client computer 34a, b, c when the client computer 34a, b, c first accesses a host of the mail server 36 over the network 32. For instance, if the URL for the host of the post office system 44 is "www.hostname.com," then the following HTML command (1) would be added to the web page initially transferred to the client computer 34a, b, c when accessing http:\\www.hostname.com.

(1) <HREF="http://www.hostname.com[:port]/ccmail/cgipipe.exe?welcome">

Click here to access the mail system</A>

In the above command (1) structure, the program "cgipipe.exe" is a Common Gateway Interface (CGI) application that carries data between the HTTP server 40 and the mail program 42. In preferred embodiments, the client computer 34a, b, c formats commands as CGI commands which are submitted as URLs or forms to the mail program 42 via the HTTP server 40. The mail program 42 then generates an HTML web page based on the received commands which the mail program 42 transfers back to the client computer 34a, b, c via the HTTP server 40 for display on the web browser 38. In the above example, the mail program 42 is located in a directory identified as ccmail, which is a subdirectory of the directory including the HTTP server 40.

Figure 4:
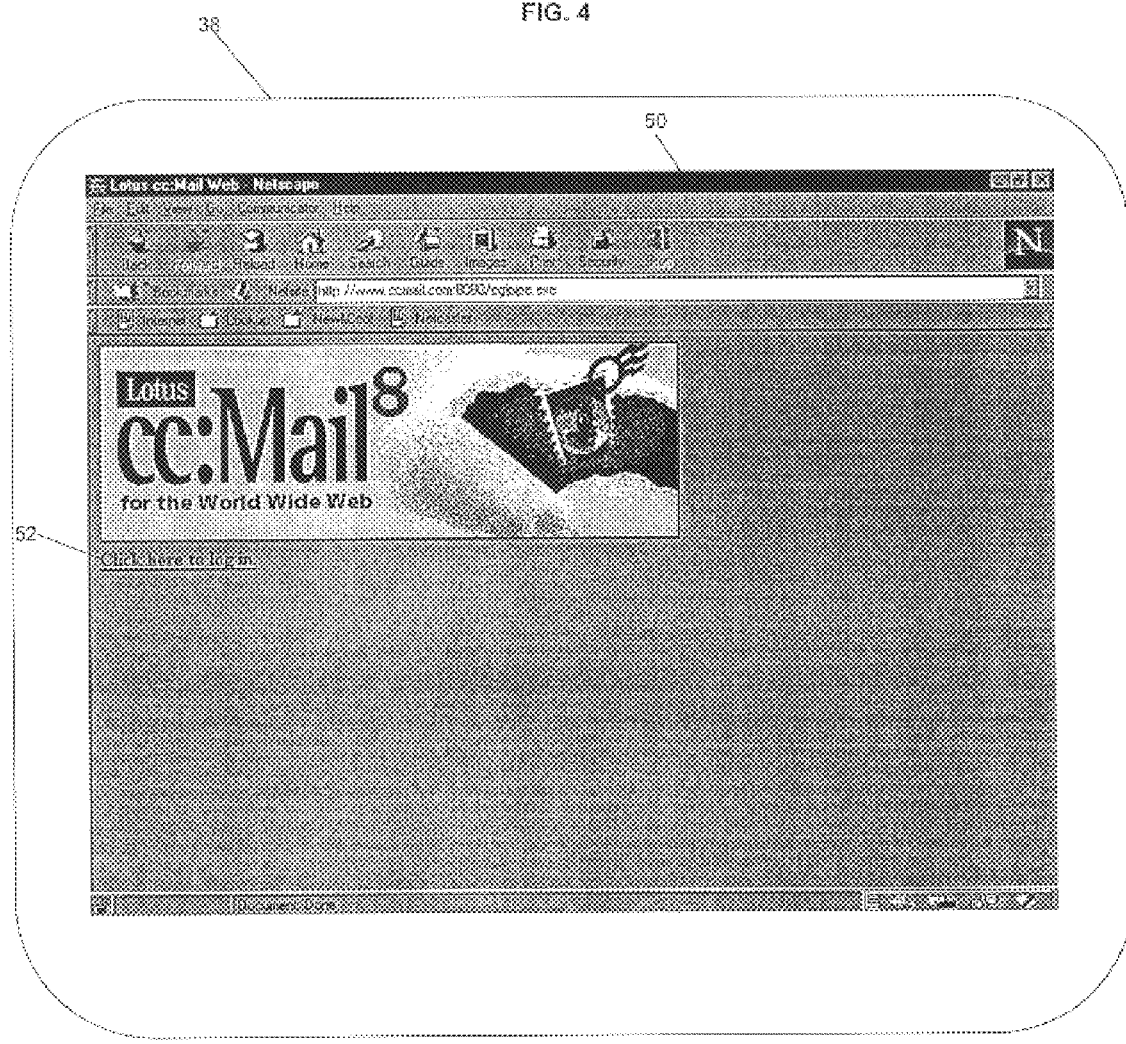
FIGS. 4–7 illustrate snapshots of HTML web pages displayed in accordance with preferred embodiments of the present invention.
Figure 5:
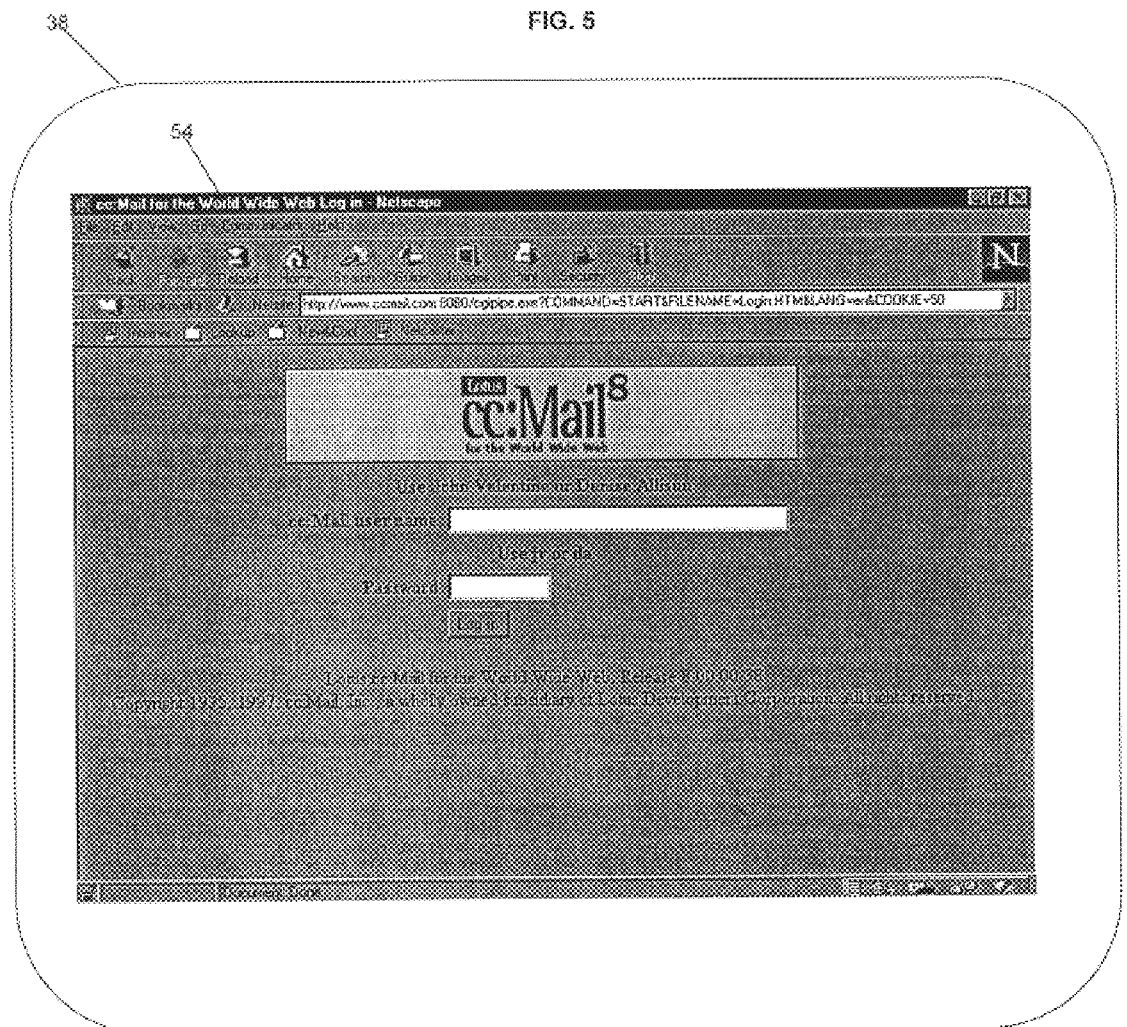
Figure 6:
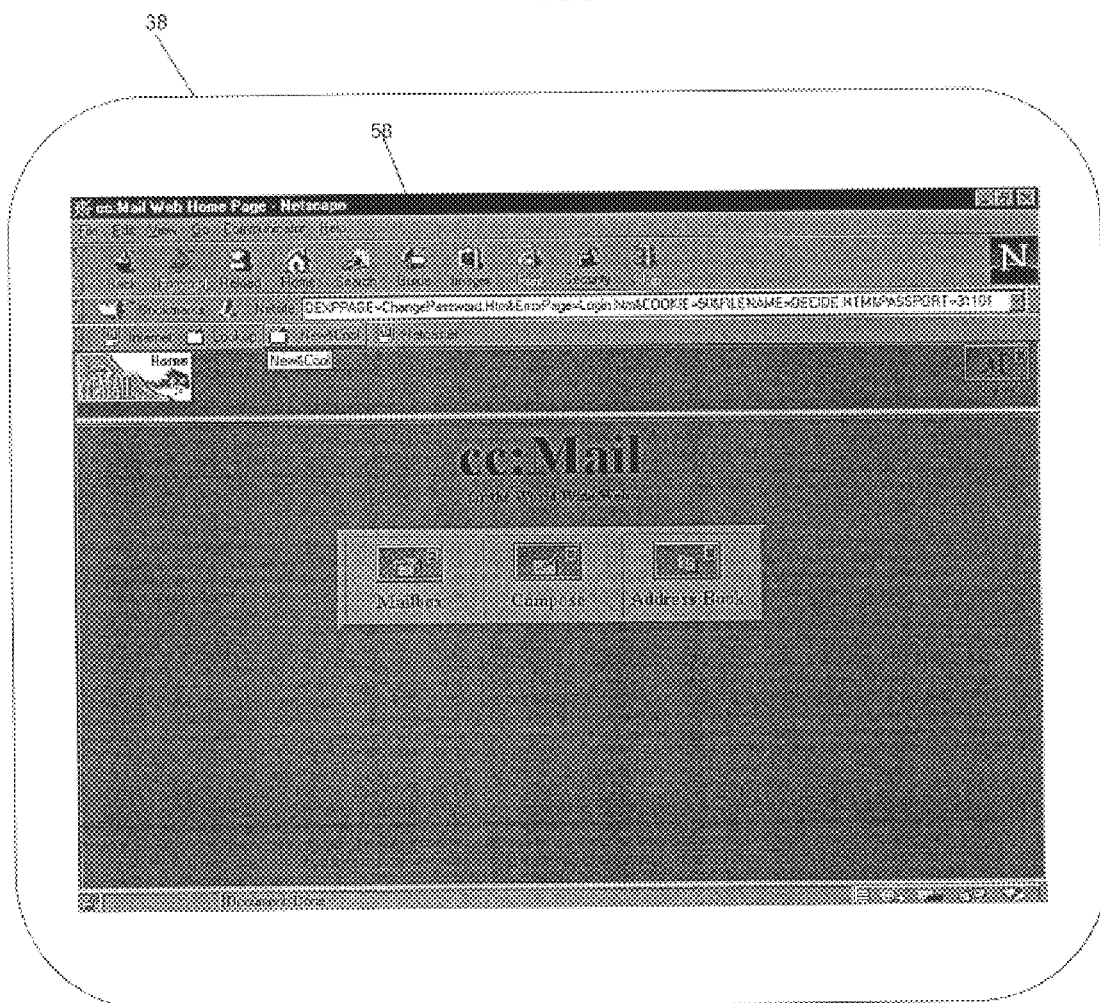
Figure 7:
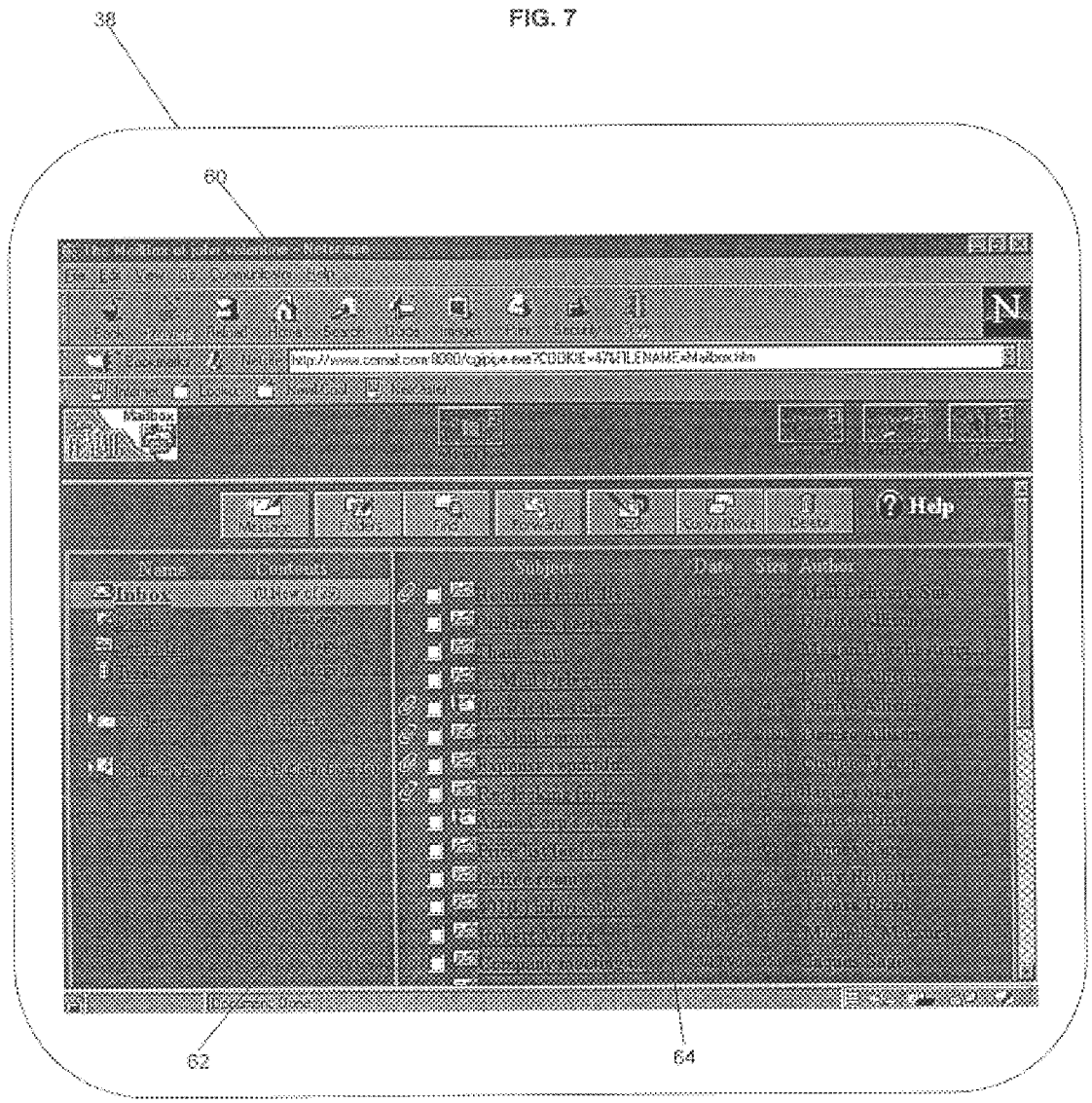

FIG. 4 illustrates an HTML web page 50 transferred to the client computer 34a, b, c web browser 38 when a user at the client computer 34a, b, c accesses www.hostname.com. This web page 50 includes a hypertext link 52 generated by the above command (1). FIG. 5 illustrates a log-in web page 54 transferred to the web browser 38 in response to the user selecting the hypertext link 52. FIG. 6 illustrates a web page 58 transferred to the web browser 38 after the user logs-in at the log-in web page 54. The web page 58 presents different mail box options to the user, such as "Mailbox" to enter the user's mail box, "Compose" to create a message, and "Address Book" to review and edit entries in the user's address book. FIG. 7 illustrates a main mail box page 60 generated by the mail program 42 when the user selects the Mailbox icon displayed in the web page 58. The mail box page 60 includes two frames 62 and 64. Frame 64 is comprised of two sides 64a and 64b. Side 64b displays hypertext links to an inbox, draft messages, sent mail, trash, folders and bulletin boards. Side 64b of frame 64 provides hypertext links to messages in the selected inbox.

Preferred embodiments of the web pages 50, 54, 58, 60 assembled by the mail program 42 are comprised of HTML code, mail box commands, subtemplate commands, and subtemplates. The mail box specific commands are directives to the mail program 42 to replace the string of characters in the command with mail-specific data obtained from the post office system 44.

FIG. 8a shows portions of HTML code for the mailbox template 70 used to generate the mail box web page 60 shown in FIG. 7. The template 70 includes the LISTMSGS subtemplate command 72 to call out the subtemplate MailboxMsgs.HTM for the first five messages in the mailbox. FIG. 8b shows portions of the HTML code for the subtemplate 76 MailboxMsgs.HTM which generates the display of each message up to a specified number. The subtemplate 76 includes a MSGDATE mail box command 78 to generate the date of a message in the mailbox, a SIZE mail box command 80 to generate the size of a message, and an AUTHOR 82 mail box command to generate the name of the author of the message. The mail program 42 executes the subtemplate command LISTMSGS 72 and generates the subtemplate 76 in the Mailbox template 70 for each message to be displayed. When a system administrator wants to modify the display of messages in the inbox, the system administrator need only modify the subtemplate MailboxMsgs.htm 76 as a separate module and not other commands within the Mailbox template 70. This system of using subtemplates allows a system administrator to readily control the display of specific subcomponents, such as messages, by editing the HTML code in the subtemplate displaying specific information within the larger parent template.

As discussed, the subtemplate command LISTMSGS 72 calls out the subtemplate MailboxMsgs.HTM for a number of iterations. For each iteration, the subtemplate command 72 generates the contents of the called subtemplate into the mailbox template 79. For instance, if there were five messages in the mailbox, the subtemplate command 72 would call out the subtemplate 76 for each of the five messages and generates the subtemplate 76 five times in the template 70. FIG. 8c illustrates pseudo code for the subtemplate command LISTMSGS 72. The subtemplate command LIST-MSGS 72 includes a loop 74, utilizing a command such as the C++ while or dowhile command to generate the subtemplate 76 while a condition is present. For the subtemplate command LISTMSGS 72, the while loop iterates for the maximum number of messages per page. Thus, the subtemplate 76 is generated for the first message and all subsequent messages up until the maximum number of messages that can be displayed in the frame portion 64b has been reached.

With reference to FIG. 8c, for the first iteration the message identification code (MsgID) is set to the first message (MeFirst). Within the loop 74, after each iteration, the MsgID is set to the next message ID, obtained by the MeNext( ) function. MeNext( ) takes as a parameter a MsgID and returns the identification code for the following message. The variable MsgCount is incremented each time the subtemplate 76 is generated into the template. The subtemplate MailboxMsgs is generated into the template 70 from which the subtemplate command 72 was called until the MsgCount variable reaches the total number of messages that can be displayed in the frame portion 64b. The subtemplate command may be written in any complete programming language including branching, such as Java, C++, Fortran, Perl, etc.

After generating the subtemplate 76 into the template 70, the mail program 42 proceeds to process the mail box specific commands in the template 70, including those commands 78, 80, and 82 added when the subtemplate was generated into the template. Mail box commands are used to obtain information from the mailbox. The mail program 42 replaces the mail box commands with the requested information from the post office system 44. FIG. 8d shows a portion of a mail box template 86 that results from the mail program 42 processing the template 70 and subtemplate commands 78, 80, 82 generated therein. The portion of the template 86 shows the subtemplate 76 inserted twice at 90 and 94 for two messages. The subtemplates 76 for the other three of the five messages are not shown. When processing the mail box commands 78, 80, 82 within the generated subtemplates 76 (FIG. 8b), with reference to FIG. 8d, the mail program 42 substitutes dates at 90a and 94a for the command MSGDATE 78, message sizes 90b and 94b for the command SIZE, and author names 90c and 94c for the command AUTHOR.

Other subtemplate commands in addition to LISTMSGS 72 include directives to the mail program 42 to replace the arguments in the command with subtemplates. For instance, the command <!!-ATTACHLIST> receives as an argument a subtemplate which the mail program calls out for each attached file in a message. The subtemplate command <!!-SelectedMsglist> receives as an argument a subtemplate SelectedMsgs.htm which is generated in the main template for each message the user selected. The subtemplate command <!!-DIRLIST> receives as an argument a subtemplate which it calls out for each entry in the current address book. Each subtemplate command would include unique functions and commands to carry out operations specific to the purposes of the subtemplate. Further mail box specific commands and subtemplate commands are described in Lotus Development Corporation's 1997 publication entitled "Customizing Lotus cc:Mail Release 8 for the World Wide Web," which is incorporated herein by reference in its entirety. For instance, some mail box specific commands can direct the mail program 42 to insert HTML code into the parent template to set the coloring, fonts, and layout of the display and other mail box commands can be used to access mail box information from the post office system 44 and insert such information into the template. Still other mail box commands can generate a boolean response depending on data in the post office system or on the presence of information in the template.

Logic for Generating Templates

Figure 9:
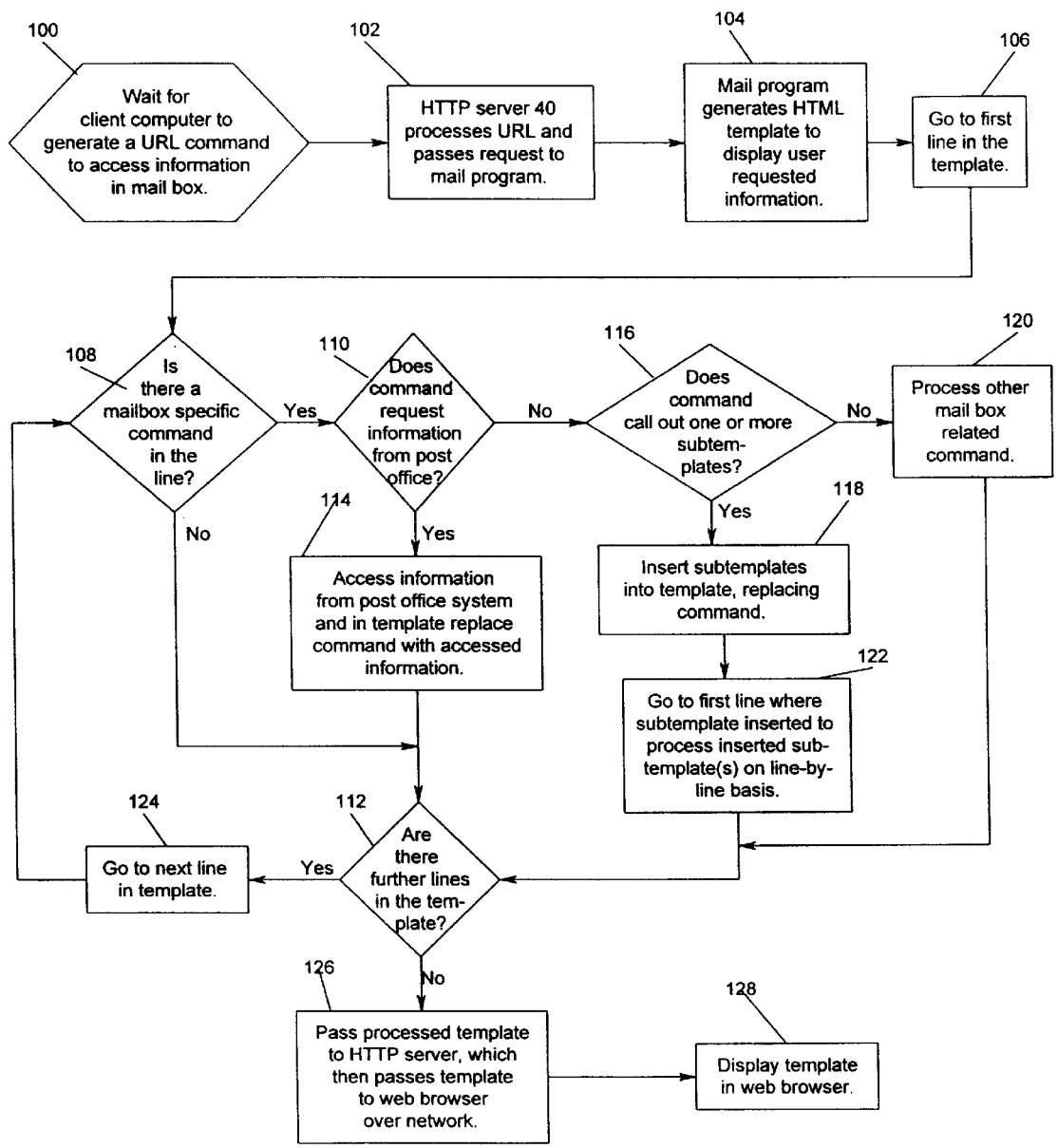
FIG. 9 is a flowchart that illustrates logic of how a mail box template is generated in accordance with preferred embodiments of the present invention.

FIG. 9 illustrates preferred logic for the processing of a request from the client computers 34a, b, c for mail box information. This logic is described with respect to the mail program 42, template 70, subtemplate 76, subtemplate command 72, processed template 86, and other elements discussed above. However, this logic would also apply to mail programs, templates, subtemplates, subtemplate commands, processed templates, and other elements other than those specifically discussed.

The logic begins at block 100 which represents a user at the client computer 34a, b, c selecting a hypertext link in the web browser 38 to access information from the post office system 44. Control transfers to block 102 which represents the HTTP server 40 processing the URL command and passing the request to the mail program 42. As discussed, the HTTP server 40 transfers the request to the mail program 42 via the cgipipe.exe application.

Control transfers to block 104 which represents the mail program 42 generating an HTML template, such as the template 70 in FIG. 8a, including HTML code, mail box commands, and subtemplate commands to generate the user interface displaying the requested mail box information. In preferred embodiments, the HTML template 70 and other templates, such as the subtemplates, used by the mail program 42 are stored in a location relative to the location of the mail program 42 and HTTP server 40. Control then transfers to block 106 which represents the mail program 42 going to the first line in the HTML template 70 to process the template on a line-by-line basis. Control transfers to block 108 which is a decision block representing the mail program 42 determining whether the line in the template 70 includes a mail box specific command 78, 80, 82 or a subtemplate command 72, and not general HTML code. In preferred embodiments, the mail program 42 can identify a mail box specific command 78, 80, 82 and subtemplate command 72 by locating two exclamation points and a dash in the tag enveloping the command, e.g., <!!-LISTMSGS>. If the command is a mail box specific command or subtemplate command, then control transfers to block 10; otherwise control transfers to block 112. If the command was HTML code and not a mail box command or subtemplate command, then at block 112, the mail box program 42 determines whether there are further lines in the template 70. If so, control transfers to block 114; otherwise control transfers to block 116. Block 114 represents the mail box program 42 proceeding to the next line in the template 70. From block 114, control returns to block 108 to process this next line in the template 70. The mail box program 42 does not process HTML code as this code is part of the processed template 86 transferred to the client computer 34a, b, c and processed at the client web browser 38.

If the line in the template 70 was not HTML code, then control proceeds to block 110, which is a decision block representing the mail program 42 determining whether the command is a mail box command 78, 80, 82 requesting information from the post office system 44, e.g., messages in the inbox, sent messages, draft messages, items on a bulletin board, etc. If so, control transfers to block 118; otherwise control transfers to block 120. Block 118 represents the mail program 42 accessing the information requested by the mail box command from the post office system 44 and replacing the mail box command with the requested information in the processed mailbox template 86. From block 118, control transfers to block 112 to process the next line in the template.

If the command was not a mail box command, then control transfers to block 120 which represents the state where the command is a subtemplate command 72 calling out one or more subtemplates. For instance, as discussed, the subtemplate command LISTMSGS 72 calls out a subtemplate for each of a specified number of messages in the inbox, e.g., if there are five messages specified, then the subtemplate would be generated in the template five separate times. Control transfers to block 122 which represents the mail program 42 executing the subtemplate command 72 and replacing the subtemplate command with the contents of the generated subtemplates 76. Control transfers to block 124 which represents the mail program 42 going to the first line where the contents of the subtemplate 76 is generated into the template. From there, control transfers back to block 108 to process the contents of the generated subtemplate 76.

A subtemplate command may include nested subtemplate commands within its code. When the mail box program 42 is processing a parent template and executes a subtemplate command including nested subtemplate commands, the mail box program 42 generates the nested subtemplate commands into the parent template from which the subtemplate command was called. The mail box program 42 would then proceed to block 124 to the first line of the generated subtemplate and process the contents of the generated subtemplate. When the mail program 42 reaches the nested subtemplate command generated into the parent template, the mail box program 42 would execute the nested subtemplate command to generate further subtemplate files into the parent template. After processing the nested subtemplate command and generating the nested subtemplate files, the mail box program 42 would proceed to block 124 to the first line of the contents of the generated nested subtemplate file to process the contents of the nested subtemplate files before processing the contents of the generated subtemplate file following the contents of the generated nested subtemplate file. In this way, the contents of a generated subtemplate are immediately sequentially processed before proceeding to process any lines following the generated subtemplate.

Control transfers to block 112 at the following points: when, at block 108, it is determined that the processed line in the template at block is not a mail box specific command or subtemplate command and when at block 114 a command to access information has been processed. The contents of a generated subtemplate are sequentially processed before proceeding to process any lines following the generated subtemplate by having control proceed to block 124 which causes the mail box program 42 to go to the first line of the generated subtemplate.

If, at block 112, the mail box program 42 determines that there are no further lines of mail box specific commands or subtemplate commands to process in the template 70, then control transfers to block 116 which represents the mail program 42 passing the processed HTML template to the HTTP server 40 to pass to the web browser 38 over the network 32. Control then transfers to block 128 which represents the web browser 38 displaying the HTML page generated by the mail program 42 and information therein.

Conclusion

This concludes the description of the preferred embodiments of the invention. The following describes some alternative embodiments for accomplishing the present invention.

In alternative embodiments, different commands and subtemplates may be used to generate post office information and perform post office functions not discussed above.

In addition, those skilled in the art will appreciate that the present invention is not limited by a specific programming language, such as HTML, but may be used to enhance any program, such as HTML, which does not include branching. The subtemplate commands may be implemented in any suitable computer language including branching, such as C++, Java, Perl, etc.

Although the use of subtemplates is described with respect to a post office system, those skilled in the art will appreciate that the preferred subtemplate method to generate templates may be used to generate information from a database system other than a post office system. Further, in the preferred embodiments, the client computers 34a, b, c communicate with the mail server 36 using the HTTP protocol. However, other communication protocols can be utilized, such as NNTP, FTP, Gopher, Telnet, etc. In such case, a non-HTTP protocol program would be included in the mail server 36.

Still further, it should be appreciated that the preferred logic of FIG. 9 is provided for illustrative purposes and that alternative logic may be used to generate templates to display mail box information to a user over a network. For instance, the logic of FIG. 9 processes the template on a line-by-line basis. However, those skilled in the art will recognize alternative algorithms for processing the template. For instance, the mail program might first scan the template for all mail box specific commands to call out subtemplates and call out such subtemplates. After generating the subtemplates in the parent template, the mail program would then scan the template a second time to process all mail box specific commands.

In summary, preferred embodiments of the present invention disclose a system for generating units of information from a database maintained in a server. The server receives a request for units of information transmitted from a client computer over a network. The server then processes the request for information and generates a template. This template includes code in a first computer language that does not allow branching, database access commands to access the requested units of information in the database, and a subtemplate command to generate contents of a subtemplate file into the template. The subtemplate command is written in a second computer language providing branching. The subtemplate file called by the subtemplate command includes code in the first computer language. The server processes the template to generate a processed template. In processing the template, the server processes the subtemplate commands in the template and generates the contents of the subtemplate file into the template. The server further processes the contents of the subtemplate file generated into the template. The server also processes database access commands in the template to access the requested units of information from the database and inserts the accessed units of information into the template. After processing the template, the server transmits the processed template to the client computer.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for generating messages maintained in an electronic post office system associated with a server, the method comprising:

receiving with the server a request for messages transmitted from a client process over a network;

receiving a request for a host web page from the client process, the host web page including a hypertext link to a log-in page;

transmitting from the server to the client process the log-in page in response to the client process selecting the hypertext link;

receiving log-in information from the client process entered in the log-in page;

transmitting from the mail server a mail page to the client process upon authenticating the log-in information from the client process;

processing with the server the request for messages to generate a template, the template comprising code in a first computer language that does not allow branching, database access commands to access the requested messages maintained in the electronic post office system, and a subtemplate command to generate contents of a subtemplate file into the template, the subtemplate command written in a second computer language providing branching, and the subtemplate file including code in the first computer language;

processing, with a mail program executing on the server, the mail program including a mail protocol program, the template to generate a processed template by:
  (i) processing the subtemplate command in the template and generating the contents of the subtemplate file into the template;
  (ii) processing the contents of the subtemplate file generated into the template;
  (iii) processing the database access commands in the template to access the messages maintained in the electronic post office system and inserting the accessed messages into the template; and transmitting the processed template to the client process.

2. The method of claim 1, wherein the subtemplate command comprises a conditional loop statement which generates the contents of the subtemplate file into the template for each of the requested messages.

3. The method of claim 1, wherein the subtemplate file includes a nested subtemplate command, the step of processing the subtemplate command and generating the contents of the subtemplate file into the template further comprises generating the nested subtemplate command into the template, and processing the contents of the subtemplate file generated into the template further comprises:

processing the nested subtemplate command and generating the contents of a subtemplate file called by the nested subtemplate command into the template; and processing the contents of the subtemplate file generated by the nested subtemplate command before proceeding to process content following the processed nested subtemplate command.

4. The method of claim 1, wherein the subtemplate file includes database access commands, the method further comprises:

processing the database access commands in the subtemplate file generated into the template; and inserting the accessed messages into the template.

5. The method of claim 1, wherein the first computer language comprises HyperText Markup Language (HTML).

6. The method of claim 1, wherein the mail protocol program comprises an HTTP server program, the client computer includes an HTML web browser, and the first computer language comprises HTML.

7. A computer programming apparatus for generating messages maintained in an electronic post office system associated with a server, the apparatus comprising:
   means, performed by the server operating under control of a mail protocol program and mail program, for processing a request for messages to generate a template, the template including code in a first computer language that does not allow branching, database access commands to access the requested messages maintained in the electronic post office system, and a subtemplate command to generate contents of a subtemplate file into the template, the subtemplate command written in a second computer language providing branching, and the subtemplate file including code in the first computer language;
   means for transmitting a host web page to the client process including a hypertext link to a log-in page in response to the client process accessing the host web page;
   means for transmitting to the client process the log-in page in response to the client process selecting the hypertext link;
   means for receiving log-in information from the client process in the log-in page;
   means for transmitting a mail page to the client process upon authenticating the log-in information received from the client process;
   means, implemented with a mail program included in the server, the mail program including a mail protocol program, for processing the template to generate a processed template, comprising:
      (i) means for processing the subtemplate command and generating the contents of the subtemplate file into the template;
      (ii) means for processing the contents of the subtemplate file generated into the template;
      (iii) means for processing the database access commands in the template to access the messages maintained in the electronic post office system and for inserting the accessed messages into the template; and
   means for transmitting the processed template in conjunction with the accessed messages to the client process.

8. The computer programming apparatus of claim 7, wherein the subtemplate command includes a conditional loop statement which generates the contents of the subtemplate file into the template for each of the requested messages.

9. The computer programming apparatus of claim 7, wherein the subtemplate includes a nested subtemplate command, the means for processing the subtemplate command and generating the contents of the subtemplate file into the template further comprises means for generating the nested subtemplate command into the template, and the means for processing the contents of the subtemplate file generated into the template further comprises
   means for processing the nested subtemplate command and for generating the contents of a subtemplate file called by the nested subtemplate command into the template; and
   means for processing the nested subtemplate file generated by the nested subtemplate command before proceeding to process content following the processed nested subtemplate command.

10. The computer programming apparatus of claim 7, wherein the subtemplate file includes database access commands, the means for processing the template further includes means for processing the database access commands in the subtemplate file generated into the template and for inserting the accessed messages into the template.

11. The computer programming apparatus of claim 7, wherein the first computer language is HyperText Markup Language (HTML).

12. The computer programming apparatus of claim 7, wherein the mail protocol program is an HTTP server program, the client computer includes an HTML web browser, and the first computer language is HTML.

13. A computer program product for use with a server executing an electronic post office system and operatively coupled to one or more client processes over a computer network, the computer program product comprising a computer usable medium having computer usable program code comprising:
   program code configured to receive a request from a client process over the computer network for messages maintained in the electronic post office system by the server;
   program code configured to receive a request for a host web page from the client process, wherein the host web page includes a hypertext link to a log-in page;
   program code configured to transmit to the client process the log-in page in response to the client process selecting the hypertext link;
   program code configured to enter log-in information with the client process in the log-in page;
   program code configured to transmit with the server a mail page to the client process upon authenticating the log-in information from the client process;
   program code configured to select an option presented in the mail page with the client process to request information from the post office system;
   program code configured to process the request for messages to generate a template, the template including code in a first computer language that does not allow branching, database access commands to access the requested messages maintained in the electronic post office system, and a subtemplate command to generate contents of a substemplate file into the template, the subtemplate command written in a second computer language providing branching, the subtemplate file including code in the first computer language;
   program code configured to process the template to generate a processed template, the program code configured to process the template comprising a mail program including a mail protocol program, and further comprising:
      (i) program code configured to process the subtemplate command and generate the contents of the subtemplate file into the template;
      (ii) program code configured to process contents of the subtemplate file generated into the template;
      (iii) program code configured to process the database access commands in the template to access the requested messages maintained in the electronic post office system and insert the accessed messages into the template; and
   program code configured to transmit the processed template with the accessed messages to the client process.

14. The computer program product of claim 13, wherein the template command comprises a conditional loop statement which generates the contents of the subtemplate file into the template for each of the requested units of information.

15. The computer program product of claim 13, wherein the subtemplate includes a nested subtemplate command, the program code configured to process the subtemplate command and generate the contents of the subtemplate file into the template further comprises program code configured to generate the nested subtemplate command into the template, and program code configured to process the contents of the subtemplate generated into the template further comprises:

program code configured to process the nested subtemplate command to generate the contents of a subtemplate file called by the nested subtemplate command into the template; and program code configured to process the contents of the subtemplate file inserted by the nested subtemplate command before proceeding to process content following the processed nested subtemplate command.

16. The computer program product of claim 13, wherein the subtemplate file comprises database access commands, and further comprising:

program code configured to process the database access commands in the subtemplate file generated into the template and further configured to insert the accessed messages into the template.

17. The computer program product of claim 13, wherein the first computer language is HyperText Markup Language (HTML).

18. The computer program product of claim 13, wherein the mail protocol program is an HTTP server program, the client process includes an HTML web browser, and the first computer language is HTML.

* * * * *